United States Patent [19]
Winter, III

[11] 3,917,733
[45] Nov. 4, 1975

[54] ADSORBENT TREATING PROCESS FOR BOTH A LIQUID AND A GASEOUS HYDROCARBON STREAM

[75] Inventor: George R. Winter, III, Des Plaines, Ill.

[73] Assignee: Universal Oil Products Company, Des Plaines, Ill.

[22] Filed: Apr. 4, 1974

[21] Appl. No.: 457,739

[52] U.S. Cl............... 260/674 SA; 55/71; 208/262; 260/671 R; 260/674 R; 260/683.41
[51] Int. Cl.² .......................................... C07C 7/12
[58] Field of Search...... 260/671 R, 674 SA, 674 R, 260/683.41; 208/262; 55/71

[56] References Cited
UNITED STATES PATENTS

| | | | |
|---|---|---|---|
| 2,374,819 | 5/1945 | Kanhofer et al. | 260/683.41 |
| 2,440,542 | 4/1948 | Hughes | 55/71 |
| 2,583,352 | 1/1952 | Berg | 55/71 |
| 2,678,954 | 5/1954 | O'Neil et al. | 208/262 |
| 3,238,268 | 3/1966 | Fenske | 260/671 |
| 3,631,122 | 12/1971 | Berger | 260/671 |

Primary Examiner—Delbert E. Gantz
Assistant Examiner—C. E. Spresser
Attorney, Agent, or Firm—James R. Hoatson, Jr.; Robert W. Erickson; William H. Page, II

[57] ABSTRACT

Halogen containing chemicals are removed from a liquid hydrocarbon stream by a solid non-regenerative adsorbent in a treating zone. When the adsorbent becomes incapable of treating the liquid stream, it is used to treat a gaseous stream to remove halogens. A sequential switching of the liquid and gaseous streams provides continuous operation with fixed beds of adsorbent. The preferred embodiment encompasses a moving-bed process in which fresh alumina removes a boron oxide hydrate complex from a liquid aromatic hydrocarbon stream and the resulting unregenerable used alumina then treats an off-gas stream of the process to remove fluorine.

14 Claims, 1 Drawing Figure

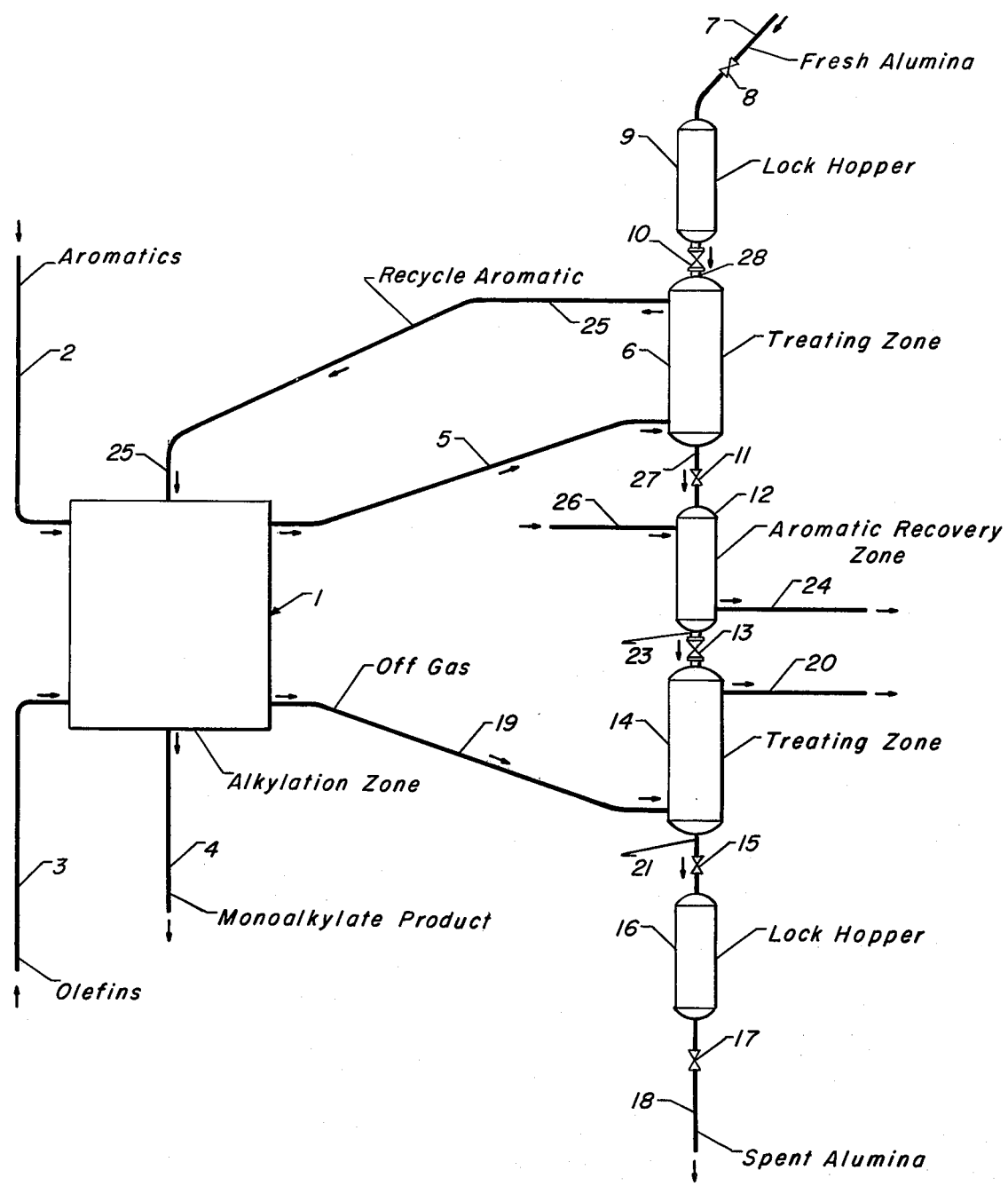

ADSORBENT TREATING PROCESS FOR BOTH A LIQUID AND A GASEOUS HYDROCARBON STREAM

BACKGROUND OF THE INVENTION

1. Field of the Invention

The invention relates to the treatment of liquid and gaseous hydrocarbon streams with solid adsorbents to remove halogens and halogen-containing compounds. The invention also involves the use of a moving-bed of the adsorbent. The adsorbent is first used to treat a liquid stream. When its capacity to treat the liquid stream is exhausted, it is then used to treat a gaseous stream. The invention therefore relates to the increased utilization of non-regenerable adsorbents, particularly alumina.

The invention also relates to a method of treating an aromatic hydrocarbon stream of a boron trifluoride promoted alkylation process for the removal of insoluble boron oxide hydrates formed in the process and to a method of simultaneously treating the off-gas stream of the process for the removal of fluorine vapors, with the treating steps being performed using the same alumina as it moves downward through successive treating zones.

2. Description of the Prior Art

Boron trifluoride promoted alkylation-transalkylation processes used to produce mono-alkylated aromatic hydrocarbons are well known to the art, and one particular process is presented in U.S. Pat. No. 3,126,421 (Cl. 260–671). It is also known in the art that in such a process, it is desirable to remove the nonvolatile hydrates of the boron oxides formed by the reaction of residual water in the feed streams with the boron halides used to promote the desired reaction and that this may be performed with alumina.

The removal of selected components from a gas stream by adsorption is well known in the art as shown by U.S. Pat. No. 2,180,712. The increased selectivity and surface area of molecular sieves has caused them to predominate in the removal of inorganic compounds from vapor streams. In Chapter 16 of *The Chemical Engineer's Handbook*, 4th Edition, McGraw-Hill Book Co., New York, 1963, the suitability of using alumina for drying gases and the defluorination of alkylates is indicated on Page 16-4. Continuous countercurrent gas and liquid sorption operations are described starting at Page 16-20. Examples are presented using moving or fluidized beds of activated charcoal and silica gel for gas treating operations. U.S. Pat. No. 3,775,310 (Cl.210–33) presents a continuous ion exchange process using countercurrent flow of the adsorbent and treated liquid.

The instances in these references in which two different fluids contact the adsorbent are distinguished from the process of the present invention in that both are of the same phase, either vapor or liquid, and the second fluid is used to regenerate the adsorbent material. In contrast, the present process uses unregenerable spent adsorbent to treat a different phase fluid. The prior art is also silent as to the ability of an adsorbent, such as active alumina, to be used to treat a gaseous stream to remove a halogen after it is spent relative to removing halogen containing compounds from a liquid hydrocarbon stream.

BRIEF SUMMARY OF THE INVENTION

The invention increases the usefulness of a solid adsorbent in removing halogen containing chemicals from fluid streams. It has been found that although the adsorbent material is spent relative to treating a liquid stream, it may still be used to treat a gaseous stream. This eliminates the need to scrub the gas with a basic media or to treat it with a quantity of fresh adsorbent. There is therefore no disposal problem and no adsorbent cost for the gaseous stream treating operation. Specifically, the invention provides a continuous process wherein an aromatic hydrocarbon stream formed in a boron trifluoride promoted aromatic hydrocarbon alkylation process is treated for the removal of boron oxide hydrates by passage through a bed of alumina contained in a first treating zone; spent alumina from the first treating zone is passed into an aromatic hydrocarbon recovery zone; the spent alumina is then passed into a second treating zone wherein an off-gas stream of the alkylation process is treated for the removal of fluorine; and, the treated off-gas stream is used in the aromatic hydrocarbon recovery zone to remove the aromatic hydrocarbon.

DESCRIPTION OF THE DRAWING

The drawing presents a schematic representation of one possible configuration of the flow utilized in the preferred embodiment of the invention. The drawing indicates one way in which the treating process is integrated with a boron trifluoride promoted alkylation process contained in alkylation zone 1. In the alkylation zone a feed stream of aromatic hydrocarbons entering through line 2 is reacted with a feed stream of olefinic hydrocarbon entering by line 3 to form a monoalkylated product which is removed via line 4. A residual amount of water in the feed streams reacts with boron trifluoride in the reaction zone to form nonvolatile boron oxide hydrates, which are then complexed with additional amounts of a relatively pure boron halide. The resultant complex is withdrawn in an aromatic hydrocarbon recycle stream in line 5 and passed through a first treating zone 6. The boron oxide hydrate complex is adsorbed on the alumina within this zone, and the resulting substantially boron oxide hydrate free aromatic hydrocarbon stream is returned to the process in line 25.

Fresh alumina is intermittently passed into lock hopper 9 through line 7 at a rate controlled by valve 8. This lock hopper is utilized as an isolation zone in which the alumina is purged, dried and pressurized as required. Valve 10 in line 28 is then intermittently opened to pass a quantity of fresh alumina into the first treating zone 6. This quantity is preferably only a fraction of the total capacity of the treating zone. The alumina gradually moves downward through the first treating zone as approximately equal quantities of spent alumina are passed through valve 11 and line 27 into an aromatic hydrocarbon recovery zone 12. The alumina is withdrawn from the first treating zone when it is saturated with the boron oxide hydrates. A stream of vapor such as steam, off-gas or a hydrogen rich gas, is passed into the top of the aromatic hydrocarbon recovery zone through line 26. This flushes the liquid aromatic hydrocarbons contained in the recovery zone out through line 24. The remaining aromatic hydrocarbons are then removed from the surface and pores of the alumina by a dry gas stream charged to the aromatic removal zone through line 26. A quantity, or possibly all, of the now dry used alumina within the hydrocarbon recovery zone 12 is passed through valve 13 in line 23 and into a second treating zone 14. In this treating zone the used alumina selectively removes fluorine, or boron trifluoride, from an off-gas stream which is removed from the alkylation process via line 19. The treated off-gas stream is passed from the second treating zone through line 20 to be vented or sent to a gas recovery unit. The alumina continues to move downward through the second treating zone at a rate controlled by valve 15 in line 21. It is then passed into a lock hopper 16 wherein it is purged and depressurized as required for its safe withdrawal from the process. Finally, the alumina is passed out of the process through line 18 by opening valve 17.

DETAILED DESCRIPTION

In the chemical processing industries, it is often necessary to remove a halogen-containing chemical from a fluid stream. As used in this description and the appended claims, the term "halogen-containing chemical" is intended to embrace any chemical formulation containing a halogen atom in its molecular structure. This includes the halogens themselves and compounds containing the halogens and atoms of other elements. The process streams from which these materials are removed must be characterized as fluid streams since they are both gaseous and liquid. These halogen-containing chemicals may originate from a halogen-containing catalyst or from a reactant used in a halogenation step or may be formed as a by-product of a hydrocarbon conversion reaction. It may be desirable to remove these materials to meet purity standards for a product, to prevent contamination of other reactants or to meet environmental standards for plant effluents. In this latter regard, it is becoming increasingly important to treat off-gas streams for the removal of all chemical compounds, especially halogen-containing chemicals. The fluid streams which are treated in the process of the invention include the off-gas or product streams of processes using a concentrated halogen-containing acid as a catalyst, such as the hydrofluoric acid-catalyzed alkylation of normal paraffins to produce gasoline blending components.

One of the most common methods of removing these halogen containing chemicals is to pass the fluid stream through a bed of selective adsorbent such as alumina, bauxite, silica gel or activated charcoal. This is normally performed using a fixed bed of the adsorbent, but as previously indicated moving beds have also been utilized. For instance, alumina is used to remove boron oxide hydrates from a liquid hydrocarbon stream. The alumina cannot be regenerated and used again after the alumina has adsorbed an amount of these hydrates, which are described in detail below, equal to about 7 to 10 wt. % of the alumina, the alumina becomes substantially incapable of adsorbing additional amounts of the hydrates. The alumina is simply spent and must be disposed of.

A method of treating gaseous streams for the removal of halogen containing chemicals is to contact them with a basic medium in a scrubbing operation. This method yields either a liquid or solid waste disposal problem depending on which cation ties up the halogen. The cost of installing and operating either of these treating systems is an increasingly important factor in the profitability of many petroleum processing units. It is important that the treating process be performed in the most economical method available. The objective of my invention therefore is to provide a method for the continuous removal of halogen-containing chemicals from fluid streams with a minimum amount of adsorbent. Further, the objective is to provide a method for treating both a liquid and a gaseous stream with the same quantity of a non-regenerative adsorbent. Specifically, the objective of the invention is to provide a method of treating a liquid stream to remove boron oxide hydrate complexes and also treating a gaseous stream to remove fluorine with the same quantity of a non-regenerative adsorbent. By the process of the invention, these gaseous streams may be treated without the creation of a waste disposal problem or the purchase of a treating medium. Basically, the invention involves the reuse of an adsorbent, which is considered spent and non-regenerative in respect to treating a liquid stream, to treat a gaseous stream. The invention is therefore characterized as a non-regenerative process to distinguish it from those in which the adsorbent may be used for a subsequent treating step because it has been regenerated.

This multi-stream treating process may be accomplished with either fixed or moving-beds of the selective adsorbent. When a fixed bed is used, a plurality of beds are interconnected with piping and valves to allow a "swing" type operation. This begins with passing the liquid hydrocarbon stream to be treated through a treating zone containing the chosen selective but non-regenerative adsorbent. The treating zone may contain one or more beds, or even one or more individual treaters, with large quantities of the adsorbent confined between porous screens. Most treating zones are operated with a downward fluid flow to prevent fluidization of the adsorbent. They may also be operated with a radial flow to accommodate high flow rates at a low pressure drop. This flow will be continued at least until the adsorbent in the first treating zone is substantially spent. At this point it is desirable to either completely switch the flow of the liquid hydrocarbon stream to a parallel second adsorbent-containing treating zone or to switch a second treating zone on stream in series. This is often done to avoid the "break through" of the halogen containing compound. Either type of operation is intended to be included within the meaning of the phrase "switching the flow". This phrase is intended to mean an operation whereby the flow of the liquid stream is caused to pass into and through a different treating zone, except when on the start up of the process, the liquid hydrocarbon stream is passed through two or more treating zones. A significant part of the "switching" operation is the cessation of the flow of the liquid hydrocarbon stream through the first treating zone.

To avoid break through of the halogen containing chemical when the first and second treating zones are operated in parallel, the flow of the liquid hydrocarbon stream will be switched before the adsorbent in the first treating zone is entirely incapable of adsorbing more of the halogen-containing compound. This necessary and normal procedure is intended to be described by the language of the appended claims that the flow is switched "when the non-regenerative adsorbent in the first treating zone is substantially incapable of adsorbing additional amounts of the halogen-containing chemical." The effectiveness of the adsorbent is of course closely monitored to avoid the disposal of unnecessary amounts of usable adsorbent. Nevertheless, it is still preferred to operate in series flow. This allows complete utilization of the adsorbent and prevents the possibility of breakthrough of the halogen-containing chemical. In this instance, the liquid hydrocarbon flow through the first treating zone will be cut off, that is, the flow will be switched, after the adsorbent in the first treating zone is actually incapable of further treating any of the liquid hydrocarbon stream.

The first treating zone is then removed from the liquid treating service and preferably drained and purged to recover the liquid hydrocarbon. A gaseous stream containing a halogen-containing chemical is then passed through the first treating zone and the adsorbent selectively removes the halogen-containing chemical. This gaseous stream may be predominately nitrogen, hydrogen, light hydrocarbons or an oxygen-containing gas. The halogen-containing chemical removed from the gaseous stream is a volatile compound such as boron trifluoride or a pure halogen such as chlorine. This treatment of a gaseous stream with the used non-regenerative adsorbent is not found in the prior art. The gaseous stream which is treated may be used to remove the remaining liquid hydrocarbons from the treating zone. Hopefully, the relative size of the liquid and gaseous streams and the relative concentration of the removed materials are such as to allow the used adsorbent to treat all of the gaseous stream. If this is not possible, the liquid treating step may be halted sooner to provide adsorbent of increased activity for the gaseous treating step. When fixed beds of adsorbent are used, it is necessary to have at least three treating zones, one each for liquid treating, gaseous treating and adsorbent replacement. When the adsorbent in the second treating zone reaches the point of being substantially incapable of adsorbing more of the halogen-containing chemical compound from the liquid hydrocarbon stream, the liquid flow is switched to the third treating zone. The gaseous stream is then switched to the second treating zone, and the adsorbent in the first treating zone is replaced.

In accordance with the above description, the invention, when utilized in a fixed bed operation, may be described as a method for the continuous operation of a treating process which comprises the steps of: (a) passing a liquid hydrocarbon stream containing a first halogen-containing chemical through a first treating zone containing a non-regenerative adsorbent to effect the removal of at least a portion of the first halogen-containing chemical; (b) switching the flow of the liquid hydrocarbon stream to a second treating zone containing the same non-regenerative adsorbent when the non-regenerative adsorbent in the first treating zone is substantially incapable of adsorbing additional amounts of the first halogen-containing chemical; and, (c) passing a gaseous stream containing a second halogen-containing chemical through the non-regenerative adsorbent in the first treating zone to effect a removal of at least a portion of the second halogen-containing chemical.

The invention also embodies the use of a moving-bed system wherein the treatment of the liquid hydrocarbon stream and gaseous streams is performed in separate treating zones in a manner similar to that shown in the drawing. Preferably, these distinct treating zones are vertically stacked to allow transportation of the adsorbent by gravity flow. In this moving-bed embodiment, there may be utilized a separate hydrocarbon recovery zone after the liquid treating or first zone. With a moving-bed operation, it will normally be necessary to use a lock hopper before the first treating zone and after the last treating zone to purge the adsorbent or to dry it, etc., as may be required. The exact operations conducted in the lock hoppers will depend on such factors as the original condition of the adsorbent used and the composition of the streams which are treated.

To allow continuous operation with uniform results, it is preferred that only aliquot quantities of the adsorbent be transferred into and out of each zone during each transfer operation. A quantity of adsorbent is intermittently added to the top portion of the treating zone, and normally an equal portion of adsorbent will be intermittently removed from a lower portion of the treating zone. The total rate of addition and removal are of course equal, although the quantities added and removed may differ in size and interval. To provide continuous operation, these addition and removal operations are performed while the fluid streams are passing through the treating zones. The process will normally be operated with either countercurrent or radial fluid flow. With countercurrent flow, the liquid and gaseous streams enter a lower portion of the treating zone. This assures maximum utilization of the adsorbent before it is passed from the treating zone. This flow, however, must be controlled to avoid fluidization and mixing of the adsorbent. Radial flow operation avoids fluidization problems and reduces pressure drop, but requires the expulsion of active adsorbent if only one pass is used. A radial flow treating zone would therefore preferably provide at least two passes of the fluid stream over the solid adsorbent. The moving-bed embodiment of the invention may be characterized as a process for the continuous removal of halogen-containing chemicals from two different fluid streams which comprises the steps of: (a) intermittently passing a quantity of a fresh non-regenerative adsorbent into an upper portion of a first treating zone; (b) passing a liquid hydrocarbon stream containing a first halogen-containing chemical through the non-regenerative adsorbent contained in the first treating zone to effect the removal of the first halogen-containing chemical compound from the liquid hydrocarbon stream; (c) passing a quantity of the non-regenerative adsorbent from the first treating zone to a second treating zone when the non-regenerative adsorbent in the first treating zone is substantially incapable of adsorbing more of the first halogen-containing chemical; and, (d) passing a gaseous stream containing a second halogen-containing chemical through the non-regenerative adsorbent in the second treating zone to effect the removal of at least a portion of the second halogen-containing chemical from the gaseous stream.

The moving-bed mode of operation provides several advantages. It is therefore the preferred embodiment of the invention. One of the advantages is the smoothing out of the labor requirement for loading the adsorbent, since a uniform amount is added every day. With swing-type treaters, a large labor force is required for a relatively short time at infrequent intervals. This may be costly and is usually disruptive to normal operations. Furthermore, the smaller amount of adsorbent charged at each operation reduces the required capacity of the adsorbent preparation facilities, such as alumina drying facilities, and thereby reduces their cost. Moving-bed operation also allows greater flexibility since the adsorbent transfer rates may be easily adjusted to correspond to unusual variations in the amount of halogen-containing materials found in the fluid streams. Finally, this method of operation allows the practice of the invention with only two treating zones instead of the three required for a fixed bed system. This results in the capital costs of a moving-bed treating system appearing to be lower, largely because of the smaller amount of steel and fabrication required.

The invention may be adapted for use on a wide variety of petrochemical processes. Utilization on one specific process for the alkylation of aromatic hydrocarbons with an olefinic hydrocarbon will be described in detail to illustrate this. This process has become of significant importance in the petrochemical industries as a starting point in the manufacture of resins, plastics, detergents, elastomers, etc. For example, benzene is alkylated with ethylene to produce ethylbenzene, a desired chemical intermediate which in turn is often dehydrogenated to produce styrene, a synthetic rubber constituent. This commercially significant process is commonly promoted by the presence of a boron halide modified inorganic oxide, such as alumina, in an anhydrous alkylation promoting environment. However, as a practical manner, completely anhydrous streams of charge stock are never available and a minute amount of water inevitably enters the system. As a result, there is formed in this alkylation promoting environment a reaction product of water and the boron halide which comprises a relatively non-volatile hydrate of boron oxide. This boron oxide hydrate is normally present in small amounts of from 0.02 to about 50 wt. ppm., expressed as elemental boron, in the alkylation zone effluent, typically in a dissolved or suspended state. These reaction products are loosely referred to as borates. The alkylation zone effluent is then passed into a fractionation zone. In a first distillation column, the excess boron halide and the unreacted aromatic hydrocarbons are separated from the alkylation zone as an overhead stream and an aromatic hydrocarbon side cut stream respectively. The alkylation products are removed as bottoms material for further separation. In this distillation column, the relatively non-volatile boron oxide hydrate precipitates out to form insoluble deposits inside the distillation column and the associated reboilers which gradually accumulate and eventually hamper efficient operation of the column. One method commonly utilized in the prior art to control this deposit formation is to pass a relatively pure boron halide stream into a lower portion of this first distillation column. This halide then forms a volatile complex with the non-volatile boron oxide hydrates formed in the reaction zone, and the resultant complex is continuously removed from the distillation column as dissolved matter in the liquid aromatic hydrocarbon side cut stream. The dissolved boron oxide hydrate complex in this side cut stream is then removed by passing the side cut stream through beds of alumina which selectively adsorb and remove the boron oxide hydrate complex and produce a relatively pure recycle stream. This is more fully described in U.S. Pat. No. 3,631,122.

These alumina treaters have the disadvantage of requiring the periodic replacement of the alumina when the weight percent of the adsorbed boron oxide hydrates reaches a limiting value of about 7–10% of the alumina. This used alumina must then be removed from the alumina treating zone and disposed. It is spent in regard to the adsorption of the boron oxide hydrate complex because this adsorption is irreversible and the alumina cannot be regenerated. To meet environmental standards, it is necessary to treat the off-gas streams of this alkylation process for the removal of certain halogens, such as fluorine and boron trifluoride. As already mentioned, this may be performed by contacting the off-gas stream with a basic medium such as a caustic solution. This however results in either a liquid or solid waste disposal problem depending on which cation ties up the halogen-containing chemical. The off-gas stream of the alkylation process may also be treated with alumina.

The invention may be integrated with this boron trifluoride promoted alkylation process to perform the required alumina treating steps on these two different streams. The liquid aromatic hydrocarbon recycle stream containing the complexed boron oxide hydrates is passed through a first treating zone containing alumina to effect the removal of the boron oxide hydrates. While this liquid stream is passing through the first treating zone, small quantities of alumina are intermittently added and removed. The alumina removed from the first treating zone may be purged to recover the aromatic hydrocarbons. The alumina is then passed into an upper portion of a second treating zone through which the fluorine-containing off-gas stream is being passed. The alumina removed from the first treating zone is substantially incapable of removing any more of the boron oxide hydrates. Nevertheless, it is now used to effect the removal of the fluorine contained in the off-gas stream. It will also remove other halogen-containing chemicals. Aliquot portions of the alumina are also removed from a bottom portion of the second treating zone for disposal. It is also possible to treat the liquid drag stream removed from the overhead receiver of the first distillation column. This stream is basically unalkylated aromatics. It may contain both the boron oxide hydrate complex and dissolved halogen-containing gases. The invention may be performed with other suitable adsorbents, such as bauxite.

I claim as my invention:

1. A process for the continuous operation of a treating process utilizing a non-regenerative solid adsorbent capable of treating a gaseous stream after it has become incapable of treating a liquid stream which comprises:
   a. passing a liquid hydrocarbon stream containing a first halogen-containing chemical through a first treating zone containing a non-regenerative solid adsorbent to effect the removal of at least a portion of the first halogen-containing chemical;
   b. switching the flow of the liquid hydrocarbon stream to a second treating zone containing additional non-regenerative solid adsorbent after the non-regenerative adsorbent in the first treating zone is substantially incapable of adsorbing additional amounts of the first halogen-containing chemical; and,
   c. passing a gaseous stream containing a second halogen-containing chemical through the non-regenerative adsorbent in the first treating zone to effect a removal of at least a portion of the second halogen-containing chemical.

2. The process of claim 1 further characterized in that the non-regenerative adsorbent contained in the treating zones is alumina.

3. The process of claim 1 further characterized in that the non-regenerative adsorbent contained in the treating zone is bauxite.

4. The process of claim 2 further characterized in that the first halogen-containing chemical is a boron oxide hydrate complex formed by the reaction of boron oxide hydrates with a boron halide.

5. The process of claim 4 further characterized in that the second halogen-containing chemical is fluorine.

6. The process of claim 1 further characterized in that the adsorbent in the first treating zone is purged of liquid hydrocarbon by contact with a purging gas after step (a) and prior to step (c).

7. A process for the continuous removal of halogen-containing chemicals from two different fluid streams which comprises the steps of:
   a. intermittently passing a quantity of a fresh non-regenerative solid adsorbent into an upper portion of a first treating zone;
   b. passing a liquid hydrocarbon stream containing a first halogen-containing chemical through the non-regenerative adsorbent contained in the first treating zone to effect the removal of the first halogen-containing chemical compound from the liquid hydrocarbon stream;
   c. passing a quantity of the non-regenerative adsorbent from the first treating zone to a second treating zone after the non-regenerative adsorbent in the first treating zone is substantially incapable of adsorbing more of the first halogen-containing chemical; and,
   d. passing a gaseous stream containing a second halogen-containing chemical through the non-regenerative adsorbent in the second treating zone to effect the removal of at least a portion of the second halogen-containing chemical from the gaseous stream.

8. The process of claim 7 further characterized in that the non-regenerative adsorbent is alumina.

9. The process of claim 7 further characterized in that the non-regenerative adsorbent is bauxite.

10. The process of claim 7 further characterized in that the adsorbent is purged of liquid hydrocarbon by contact with a purging gas after step (c) and prior to step (d).

11. A process for the continuous removal of halogen-containing chemicals from process streams of a hydrocarbon conversion process which comprises the steps of:
   a. intermittently passing a quantity of fresh alumina into an upper portion of a first treating zone;
   b. passing a liquid hydrocarbon stream comprising an aromatic hydrocarbon and boron oxide hydrates through alumina contained in the first treating zone to effect the removal of the boron oxide hydrate complex from the liquid hydrocarbon stream;
   c. intermittently removing a quantity of used alumina from a bottom portion of the first treating zone while the liquid hydrocarbon stream is passing through the first treating zone;
   d. passing the quantity of used alumina removed from the first treating zone into an upper portion of a second treating zone;
   e. passing a gaseous stream comprising fluorine through used alumina contained in the second treating zone to effect the removal of fluorine from the gas stream; and,
   f. intermittently removing a quantity of alumina from a bottom portion of the second treating zone.

12. The process of claim 11 further characterized in that boron trifluoride is also contained in and removed from the fluorine-containing gas stream.

13. The process of claim 11 further characterized in that said used alumina is purged of liquid hydrocarbon by contact with a purging gas after its removal from said first treating zone and prior to the passage of the fluorine-containing gaseous stream therethrough.

14. A process for separating halogen-containing chemicals from a liquid hydrocarbon stream and a gaseous stream containing the same, which comprises the steps of:
   a. passing said liquid hydrocarbon stream through a solid adsorbent and adsorbing in the latter halogen-containing chemical from said liquid stream;
   b. continuing the passage of the liquid stream through said solid adsorbent until the adsorbent becomes substantially incapable of adsorbing additional amounts of halogen-containing chemical from the liquid stream;
   c. thereafter discontinuing the passage of the liquid hydrocarbon stream through the adsorbent and contacting the latter with a purging gas to remove therefrom liquid hydrocarbon retained by the adsorbent during the aforesaid steps (a) and (b); and
   (d) then passing said gaseous stream through said adsorbent and adsorbing therein halogen-containing chemical from the gaseous stream.

* * * * *